Feb. 7, 1933. G. H. PARKER 1,896,096
TELESCOPING FEED TROUGH
Filed Feb. 27, 1932
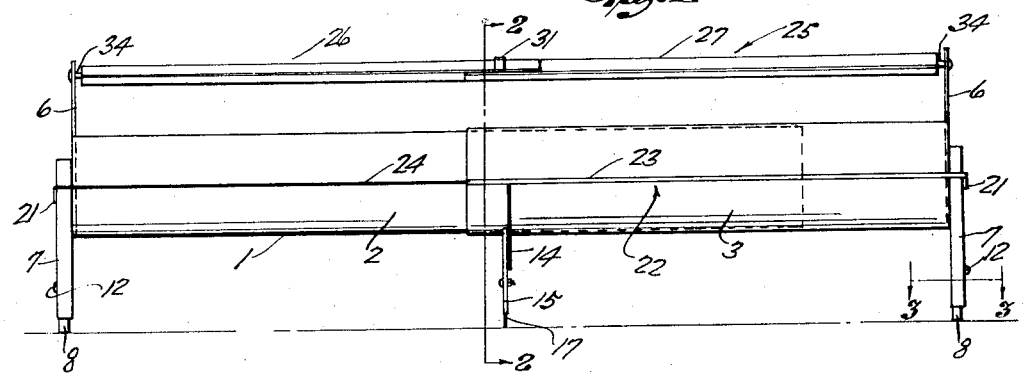
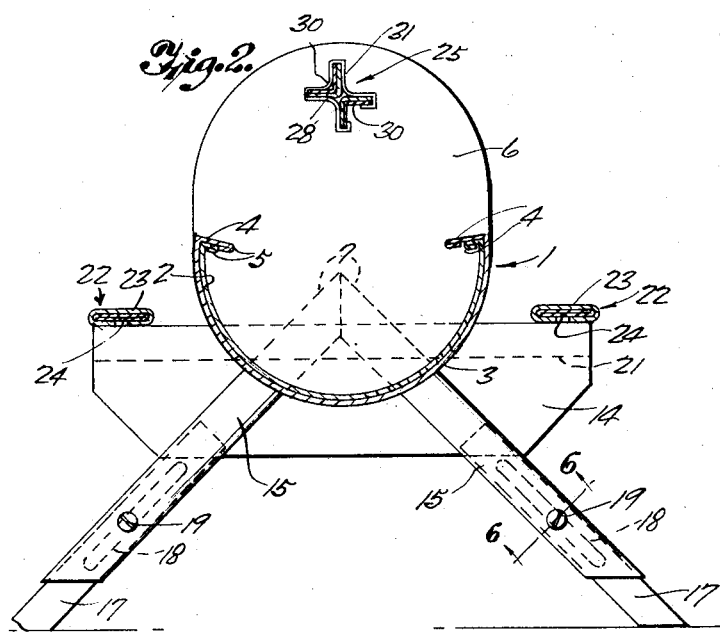
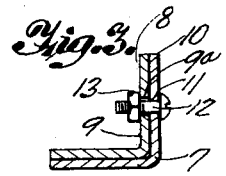
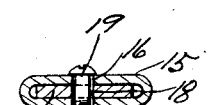
INVENTOR.
George H. Parker
BY Adam E. Fisher
ATTORNEY.

Patented Feb. 7, 1933

1,896,096

UNITED STATES PATENT OFFICE

GEORGE HOWE PARKER, OF HIAWATHA, KANSAS

TELESCOPING FEED TROUGH

Application filed February 27, 1932. Serial No. 595,514.

My invention relates to improvements in feed troughs or feeders for poultry and stock and the main object is to provide a trough comprising two or more telescopically connected sections whereby the trough may be extended or retracted to practically any length desired.

Another object is to provide a trough of this kind including also telescopically connected perch sections for use by poultry and supporting legs which are arranged to be lengthened or shortened to raise or lower the trough.

A further object is to provide a feed trough of the above character in a simple, inexpensive, durable and convenient form.

With these and other objects in view the invention resides in the novel construction and arrangement of parts as hereinafter set forth and claimed, reference being had to the accompanying drawing wherein one embodiment of the invention is shown for purposes of exemplification and wherein:

Figure 1 is a side view of the trough in a partially extended position.

Figure 2 in an enlarged cross section along the line 2—2 in Figure 1.

Figure 3 is an enlarged section along the line 3—3 in Figure 1.

Figure 4 is an enlarged cross section through one of the poultry perches.

Figure 5 is an enlarged perspective view of a portion of the telescoping anti-roost member.

Figure 6 is an enlarged section along the line 6—6 in Figure 2.

Referring now more particularly to the drawing my invention comprises a trough designated at 1 and formed of two sections 2 and 3 here shown as being of substantially semi-circular cross section though it is obvious that they may be of triangular or rectangular box-like form if so desired. The section 2 is slightly smaller than section 3 so that it will slide freely therein and the longitudinal margins 4 of each section are turned horizontally inward and adapted to slide one within the other as shown in Figure 2 whereby to aid in holding the two sections in alignment as well as to prevent waste of feed from the trough. The trough is formed of sheet metal of suitable kind and gauge and the edges of the inturned portions 4 are rolled or folded back at 5 to present a smooth edge or face. At their outer ends the trough sections 2 and 3 are secured by soldering or welding to the end pieces 6 which extend vertically upward above the trough as shown. End legs 7 are secured to the outer end faces of the ends 6 and flare or diverge outwardly at their lower ends to rigidly support the trough. These legs 7 are formed of angle iron or other material bent to a right angular cross section as shown in Figure 3 and leg extensions 8 of similar but smaller material are slidably mounted within these legs. One web 9 of each leg extension 8 is longitudinally slotted at 9a and the adjacent web 10 of each leg 7 is provided with an aperture 11 through which a belt 12 is passed, said belt passing also through the slot 9 and being provided with a nut 13. The arrangement is such that the leg extensions 8 may be drawn outward or downward to any position and locked by tightening the nut 13 thus adjusting the height at which the trough 1 is supported.

Adjacent the inner end of the outer trough section 3 a vertically set cross piece 14 is secured to the underside of the trough and center legs 15 are secured to this cross piece and extended angularly and downwardly therefrom. The legs 15 are in the form of flat tubular sleeves as shown in Figure 6 and adjacent their lower ends are provided with aligned apertures 16. Center leg extensions 17 in the form of flat bars or strips are slidably mounted in the legs 15 and are provided with longitudinally extended slots 18 registering with the apertures 16. Bolts 19 are inserted through the apertures 16 and slots 18 and are provided with nuts 20 whereby the extensions 17 may be secured in any adjusted position corresponding with the position of the end leg extensions 8 and will rigidly support the trough at its center.

The trough thus formed is adapted for hog or stock feeding as will be understood and may be extended or retracted to any desired length within the limit set by the length of the two sections 2 and 3. If a greater range of adjustment is desired it is obvious that three or more sections may be employed.

To adapt the trough for poultry feeding cross pieces 21 are secured horizontally across the end legs 7 with their upper margins in horizontal alignment with the upper edge of the cross piece 14 and perches designated generally at 22 are mounted on and secured to the laterally extending ends of these cross pieces and are thus disposed alongside and parallel with the trough 1 somewhat below the upper edges thereof. These perches 22 comprise flat tubular sleeves 23 mounted alongside the outer trough section 3 and adapted to slidably receive the flat bars or strips 24 mounted alongside the inner trough section 2 whereby to allow the perches to telescope and expand or contract as the trough does. The sleeves 23 and bars 24 correspond in length to the two sections 2 and 3 of the trough. Mounted above the trough is a roller shown indicated generally at 25 which is formed of two slidably or telescopically connected sections 26 and 27. The section 26 is formed of two angle irons or angularly bent strips 28 arranged back to back so that their webs 29 extend outward each at 90 degrees from the other and the section 27 is similarly formed of a pair of angles 30 which are slidably mounted within the angles of the section 26 as best shown in Figure 5. These ends of the sections are thus slidably connected and are held in alignment by a clip 31 formed of a flat strip of metal secured at its ends 32 by soldering or welding to the inner faces of the webs 33 of one of the angles 30 making up the roller section 27 and intermediate its ends bent and formed around the webs of the other angles as shown. At their ends the two roller sections 26 and 27 are soldered or welded to two stub shafts or trunnions 34 which are journaled loosely through the ends 6 above the trough and are upset or headed on their outer ends. The roller will thus rotate and dislodge any fowl that might attempt to roost thereon. As the trough is extended or retracted the roller will adjust itself to the proper length as will be understood.

Further details of the operation of the trough and its advantages will be apparent without further description.

While I have herein set forth a certain preferred embodiment of my invention it is understood that I may vary from the same in minor structural details, so as best to construct a practical device for the purposes intended, not departing from the spirit of the invention and within the scope of the appended claims.

I claim:

1. In a device of the kind described, a plurality of telescopically connected trough sections, longitudinally adjustable legs secured to the trough sections, and a plurality of telescopically connected perch sections supported along side the trough sections.

2. In a device of the kind described, a plurality of slidably connected trough sections, longitudinally adjustable legs secured to and supporting the trough sections, slidably connected perch sections supported alongside the trough sections, and a roller supported above the trough and comprising a plurality of slidably connected sections.

In testimony whereof, I affix my signature.

GEORGE HOWE PARKER.